(12) United States Patent
Gilmartin

(10) Patent No.: US 9,288,131 B2
(45) Date of Patent: Mar. 15, 2016

(54) SIGNAL COMBINING APPARATUS

(71) Applicant: Aeroflex Limited, Hertfordshire (GB)

(72) Inventor: David Gilmartin, Hertfordshire (GB)

(73) Assignee: Aeroflex Limited, Hertfordshire (GB)

( * ) Notice: Subject to any disclaimer, the term of this patent is extended or adjusted under 35 U.S.C. 154(b) by 84 days.

(21) Appl. No.: 13/789,582

(22) Filed: Mar. 7, 2013

(65) Prior Publication Data

US 2013/0250781 A1   Sep. 26, 2013

(30) Foreign Application Priority Data

Mar. 21, 2012  (GB) ................................. 1204903.7

(51) Int. Cl.
| | |
|---|---|
| *H04L 12/26* | (2006.01) |
| *H04B 17/17* | (2015.01) |
| *H04B 17/20* | (2015.01) |
| *H04B 17/21* | (2015.01) |
| *H04B 17/00* | (2015.01) |

(52) U.S. Cl.
CPC ................ *H04L 43/50* (2013.01); *H04B 17/17* (2015.01); *H04B 17/20* (2015.01); *H04B 17/21* (2015.01); *H04B 17/0085* (2013.01)

(58) Field of Classification Search
CPC .. H04L 43/50; H04L 12/2697; H04L 41/5038
USPC .................................. 370/250, 360, 244, 217
See application file for complete search history.

(56) References Cited

U.S. PATENT DOCUMENTS

| | | | | |
|---|---|---|---|---|
| 6,157,244 A | * | 12/2000 | Lee ......................... | G01K 7/01 323/313 |
| 6,560,448 B1 | * | 5/2003 | Baldwin et al. ............ | 455/234.1 |

(Continued)

FOREIGN PATENT DOCUMENTS

| | | |
|---|---|---|
| WO | WO 2005/052614 A1 | 6/2005 |
| WO | WO 2010/117698 A2 | 10/2010 |

OTHER PUBLICATIONS

United Kingdom Intellectual Property Office, Search Report for GB 1204903.7 dated Sep. 10, 2012, 3 pages.

(Continued)

*Primary Examiner* — Dang Ton
*Assistant Examiner* — Abdeltif Ajid
(74) *Attorney, Agent, or Firm* — Maschoff Brennan

(57) ABSTRACT

The present application relates to a signal combining apparatus having an input for receiving a signal from a signal generator and an output for outputting a signal to a signal analyzer. The input signal is split into a plurality of identical signals by a splitter and the signals are transmitted, to inputs a plurality of duplex combiners, each of which has an input/output port to which a device under test can be connected. Outputs of the duplex combiners are connected to a plurality of receive paths, whose outputs are connected to a signal relay which is operative to receive one or more signals received through the receive paths. An output of the signal relay is connected to the output of the signal combining apparatus, such that a composite signal output by the signal relay containing the signals received through the receive paths can be analyzed by the signal analyzer.

14 Claims, 11 Drawing Sheets

(56) References Cited

U.S. PATENT DOCUMENTS

| | | | | |
|---|---|---|---|---|
| 6,993,438 B2* | 1/2006 | Jacobsen | ............... | G01R 27/28 |
| | | | | 324/642 |
| 2003/0103200 A1* | 6/2003 | Stadler | ........................ | 356/73.1 |
| 2005/0240852 A1* | 10/2005 | Inaba | ................ | G01R 31/3167 |
| | | | | 714/740 |
| 2009/0240365 A1* | 9/2009 | Niijima et al. | ................ | 700/110 |
| 2010/0041354 A1* | 2/2010 | Ng et al. | ................... | 455/127.1 |
| 2010/0077270 A1* | 3/2010 | Rupp | ..................... | H04B 17/16 |
| | | | | 714/734 |
| 2010/0123471 A1 | 5/2010 | Olgaard et al. | | |
| 2013/0271303 A1* | 10/2013 | Rizzo | ................... | H03G 1/0035 |
| | | | | 341/143 |

OTHER PUBLICATIONS

European Patent Office, European Search Report for EP 13 15 7745 dated Jun. 6, 2013, 6 pages.

\* cited by examiner

SIGNAL COMBINING APPARATUS

CROSS-REFERENCES TO RELATED APPLICATIONS

The present application claims priority to Great Britain Patent Application No. 1204903.7, filed Mar. 21, 2012 entitled "Signal Combining Apparatus" the entire disclosure of which is hereby incorporated by reference, for all purposes, as if fully set forth herein.

TECHNICAL FIELD

The present invention relates to a signal combining apparatus, in particular to a signal combining apparatus for combining RF signals, and to a method of calibrating such a combining apparatus.

BACKGROUND

Testing of wireless devices such as mobile telephones and the like typically requires high-value test assets such as vector signal analysers and vector signal generators. In order to achieve high speed throughput of devices through a test phase in a manufacturing process it is desirable to be able to test multiple devices simultaneously.

Systems for simultaneously testing multiple wireless devices have been proposed. However, many of these known systems suffer from disadvantages.

For example, many such systems require multiple signal generators and multiple signal analysers. It will be appreciated that the capital expenditure required to implement such systems is high, and a large amount of physical space is required to accommodate such systems.

Other systems that do not require multiple signal generators and signal analysers have been proposed. However, the range of tests that can be performed using such systems is limited. For example, such systems are typically unable to perform tests involving broadcasting a downlink signal to a plurality of devices under test simultaneously, and measuring the uplink from each of the plurality of devices under test sequentially in turn.

BRIEF SUMMARY

The present application relates to a signal combining apparatus having an input for receiving a signal from a signal generator and an output for outputting a signal to a signal analyser. The input signal is split into a plurality of identical signals by a high isolation splitter and the plurality of signals are transmitted via a plurality of transmit paths, which can be selectively enabled or disabled, to inputs of a plurality of duplex combiners, each of which has an input/output port to which a device under test can be connected. Outputs of the plurality of duplex combiners are connected to a plurality of receive paths, which can be selectively enabled and disabled, whose outputs are connected to a signal relay which is operative to receive one or more signals through the plurality of receive paths. An output of the signal relay is connected to the output of the signal combining apparatus, such that a composite signal output by the signal relay containing the signals received through the plurality of receive paths can be analysed by the signal analyser.

According to a first aspect of the present invention there is provided signal combining apparatus comprising: an input port for receiving an input signal from a signal generator; an output port for outputting a signal to a signal analyser; a plurality of test ports for connecting the apparatus to a plurality of devices under test (DUTs), the apparatus further comprising: a splitter for dividing a signal received at the input port into a plurality of signals; a plurality of transmit signal paths; a plurality of receive paths; a signal relay, the signal relay being configured to receive a signal through one or more of the plurality of receive paths and to output a signal to the output port, the signal output to the output port containing the signals received from the one or more of the plurality of receive paths, wherein the apparatus further comprises a plurality of duplex combiners which are each configured to: receive a signal from one of the plurality of transmit paths; transmit the signal from the one of the plurality of transmit paths to one of the plurality of test ports; receive a signal from one of the plurality of test ports; and transmit the signal received from the one of the plurality of test ports to one of the plurality of receive paths.

The apparatus permits simultaneous testing of multiple wireless devices without requiring multiple signal generators and multiple signal analysers. The splitter splits a signal received from a signal generator into a plurality of signals which can be transmitted to the plurality of devices under test via the transmit paths and the duplex combiners, with the signals received from the plurality of devices under test being transmitted via the duplex combiners to the receive paths and combined by the signal relay before being passed on to a signal analyser for analysis. The transmit and receive paths can be configured in many different ways to permit multiple different test configurations using only a single signal generator and a single signal analyser.

The plurality of transmit paths may each comprise a switchable gain stage.

The plurality of receive paths may each comprise a switchable gain stage.

The switchable gain stage may comprise an amplifier for amplifying a signal received at an input of the switchable gain stage and switching means for switching between the amplifier and a conductor.

Alternatively, the switchable gain stage may comprise an amplifier for amplifying a signal received at an input of the switchable gain stage, an attenuator for attenuating the signal received at the input of the switchable gain stage and switching means for switching between the amplifier and the attenuator such that the switchable gain stage is operative selectively to amplify or attenuate the signal received at the input of the switchable gain stage.

Each of the plurality of transmit paths may comprise a fine level control.

Each of the plurality of receive path may comprise a fine level control.

For example, the fine level control may comprise a variable attenuator.

Each of the plurality of transmit paths may further comprise an isolator for selectively enabling or disabling the transmit path.

The isolator may comprise switch means and a resistive termination, the switch means being operative to selectively connect an input of one of the plurality of duplex combiners to an output of one of the plurality of transmit paths or to the resistive termination.

Each of the plurality of receive paths may further comprise an isolator for selectively enabling or disabling the transmit path.

The isolator may comprise switch means and a resistive termination, the switch means being operative to selectively connect an output of one of the plurality of duplex combiners to an input of one of the plurality of receive paths or to the resistive termination.

The signal combining apparatus may further comprise a switchable feedback path for selectively connecting an output of one of the plurality of transmit paths to an input of one of the plurality of receive paths.

The feedback path may include a power sensor for measuring signal power in the one of the plurality of transmit paths.

The signal combining apparatus may further comprise heating means for maintaining the power sensor at a constant temperature.

The signal combining apparatus may further comprise: a power sensor for measuring the power of a signal output by one of the plurality of duplex combiners to one of the plurality of receive paths; a threshold detector for detecting whether the power of the signal output by the one of the plurality of duplex combiners meets a predetermined threshold; and control means for controlling a switchable attenuation such that if the power of the signal output by the one of the plurality of duplex combiners meets the threshold, the signal output by the one of the plurality of duplex combiners is attenuated.

The control means may be operative to control an isolator of the receive path such that when the power of the signal output by the one of the plurality of duplex combiners meets the threshold the output of the one of the plurality of duplex combiners is connected to a resistive termination.

According to a second aspect of the invention there is provided a method for calibrating signal combining apparatus according to the first aspect, the method comprising: transmitting a signal of known power along one of the plurality of transmit paths; measuring the power of the transmitted signal at an output port of the signal combining apparatus using an external measuring device; measuring the power of the transmitted signal at an output of the one of the plurality of transmit paths using an internal measuring device; storing the measurement taken by the internal measuring device as a target power measurement; subsequently transmitting a signal of the known power along the one of the plurality of transmit paths; measuring the power of the transmitted signal at the output of the one of the plurality of transmit paths using the internal measuring device; comparing the measured power of the transmitted signal to the target power; and adjusting a gain of the one of the plurality of transmit paths until that the measured power corresponds to the target power.

BRIEF DESCRIPTION OF THE DRAWINGS

Embodiments of the invention will now be described, strictly by way of example only, with reference to the accompanying drawings, of which.

DETAILED DESCRIPTION

Figure 1:
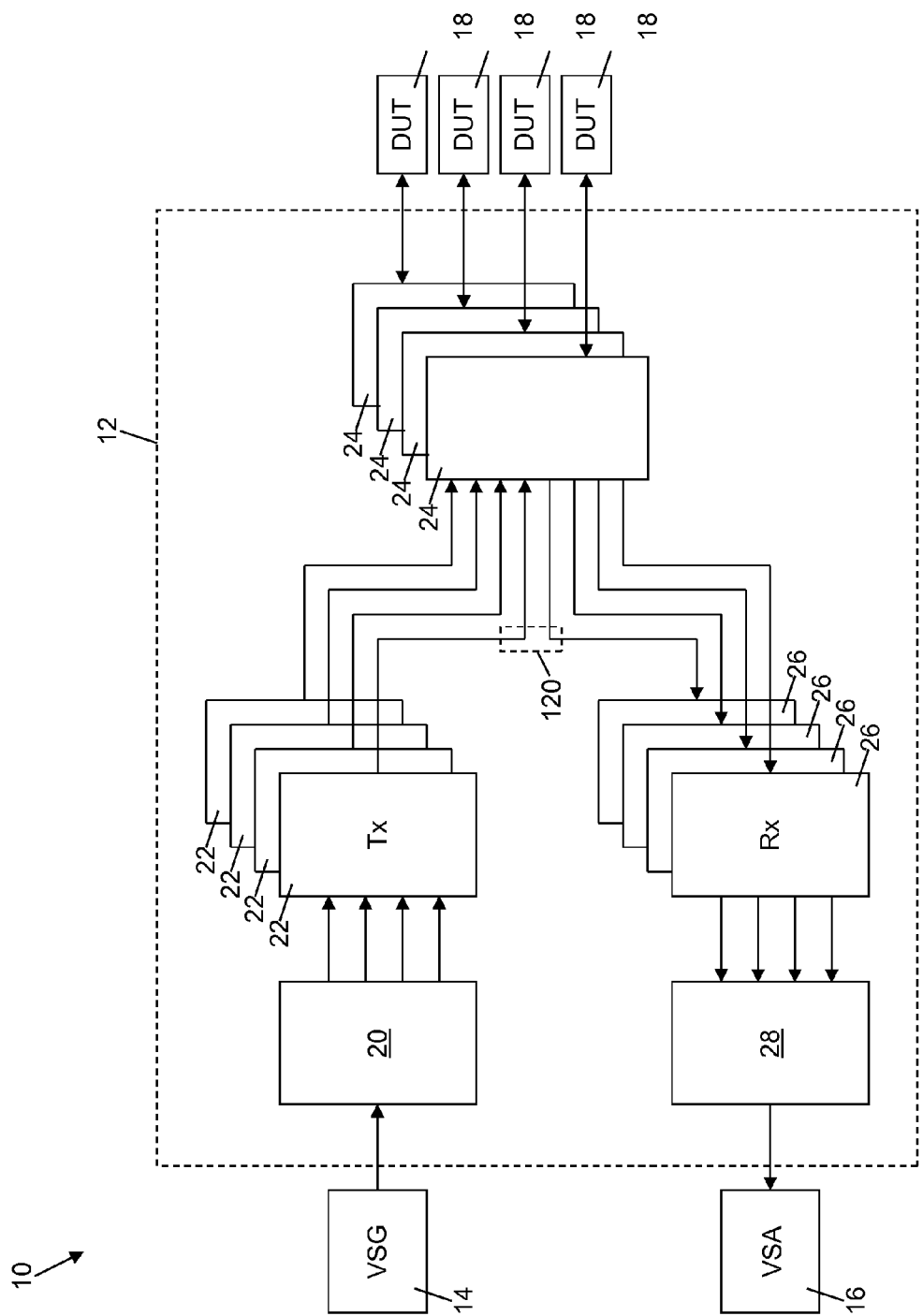
FIG. 1 is a schematic representation of a system for testing a plurality of devices under test (DUTs) incorporating signal combining apparatus.

Referring first to FIG. 1, a system for testing multiple wireless devices is shown generally at 10. The system 10 is based on an RF combiner 12 (shown in dashed outline), which has an input for receiving a signal from a signal generator such as a vector signal generator (VSG) 14 and an output for outputting a signal to a signal analyser such as a vector signal analyser (VSA) 16. The RF combiner 12 also has a plurality of test ports to which devices 18 to be tested (also referred to as devices under test, or DUTs) can be connected.

The RF combiner 12 comprises a high isolation splitter 20 which is configured to receive a signal input to the RF combiner 12 from the signal generator 14 via the input port, and split the input signal into a plurality of identical signals, each of which is output by the splitter 20 to one of a plurality of transmit paths 22.

Each of the plurality of transmit paths 22 has one or more switchable gain stages, such that the signal input to the transmit path 22 may be amplified by the transmit path, as will be explained in more detail below.

Each of the plurality of transmit paths 22 has an output which is connected to a simplex (i.e. one way) input of one of a plurality of duplex combiners 24. Each of the duplex combiners 24 has a duplex (i.e. two way) input/output port, which is connected to one of the plurality of test ports of the RF combiner 12. Thus, one of the plurality of devices under test 18 can be connected to the duplex input/output port of one of the plurality of duplex combiners 24, so as to receive one of the plurality of input signals output by the splitter 20 to the plurality of transmit paths 22.

Each of the plurality of duplex combiners 24 also has a simplex (i.e. one way) output port, which is connected to an input of one of a plurality of receive paths 26. Each of the plurality of receive paths 26 has one or more switchable gain stages, such that a signal input to the receive path 26 may be amplified, as will be discussed in more detail below.

Each of the plurality of receive paths 26 has an output which is connected to one of a plurality of inputs of a signal relay 28 of the RF combiner. The signal relay 28 is operative to receive a signal from one or more of the plurality of receive paths 26, and to output a single composite signal containing the signals received from the one or more of the plurality of receive paths to the output of the RF combiner 12 to which a signal analyser 16 can be connected for analysing signals received from the devices under test 18. Thus, where the signal relay 28 receives signals from two or more of the receive paths 26, it is operative to combine the received signals to generate the composite output signal. On the other hand, where only one signal is received by the signal relay 28, e.g. if a signal is present in only one of the plurality of receive paths 26, or if only one of the plurality of receive paths 26 is active, the "composite signal" output by the signal relay 28 will contain only the one signal.

Figure 2:
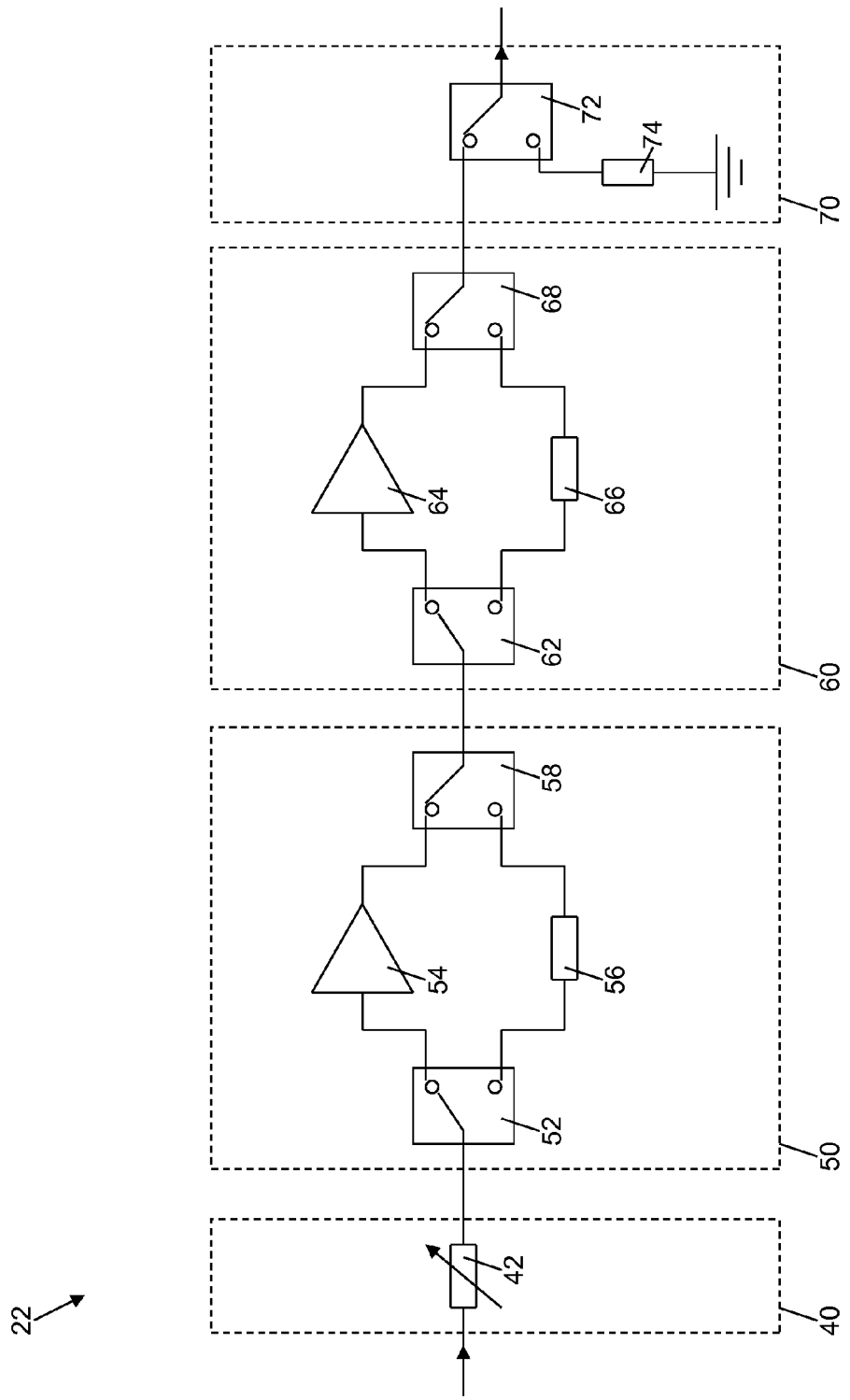
FIG. 2 is a schematic representation of a transmit path of the signal combining apparatus used in the system illustrated in FIG. 1.

Referring now to FIG. 2, an exemplary transmit path is shown generally at 22. In this example, the transmit path 22 is made up of a fine level control 40, a first gain stage 50, a second gain stage 60 and an isolator 70, so as to provide selectable different levels of amplification in the transmit path 22.

Each of the plurality of transmit paths 22 has an associated insertion loss, and this insertion loss is likely to be different for each transmit path 22, due to component tolerances in the components used to make up the transmit path 22. In use of the RF combiner 12 in the system illustrated in FIG. 1, the output signal level of the signal generator 14 can be adjusted to compensate for the bulk of the insertion loss associated with each of the plurality of transmit paths 22.

It will be appreciated that it is important that each of the plurality of DUTs 18 receives the same signal, to ensure that test conditions are the same for each DUT 18. It will also be appreciated that it is not feasible to match perfectly the characteristics of each of the plurality of transmit signal paths 22.

The fine level control 40 of each of the plurality of transmit paths 22 includes a variable attenuator 42, which helps to achieve matching of the characteristics of each of the plurality of transmit paths 22, by allowing individual fine level adjustment of the gain of the transmit path 22, to ensure that the signal level at the output of each of the plurality of transmit paths 22 is the same, and thus that the signal level received by each DUT 18 is the same. Thus, for example, the variable attenuator 42 of one the plurality of transmit paths 22 can be adjusted to compensate for the insertion loss of that particular one of the plurality of transmit paths 22, to ensure that the signal level at the output of the transmit path 22 is the same as that at the output of the other transmit paths 22.

The first gain stage 50 includes a first selector switch 52 having a single input and two outputs. The input is connected to the output of the fine level control 40. One of the outputs is connected to an input of an amplifier 54, whilst the other output is connected to an input of an attenuator 56.

The first gain stage 50 further includes a second selector switch 58, which has two inputs and one output, one input being connected to an output of the amplifier 54 and the other input being connected to an output of the attenuator 56.

The first and second selector switches 52, 58 are operative selectively to connect the input of the first gain stage 50 to either the amplifier 52 or the attenuator 54, such that the input signal is either amplified or attenuated by the first gain stage 50. In some embodiments, however, the attenuator is omitted, and in its place is a simple conductor, such that the first and second selector switches 52, 58 are operative to cause the input signal to be amplified by the amplifier 54 or else simply to bypass the amplifier 54.

The second gain stage 60 in this example takes the same form as the first gain stage 50, having a first selector switch 62 which has an input that is connected to an input of the second gain stage 60, and two outputs which are connected, respectively, to inputs of an amplifier 64 and an attenuator 66. A second selector switch 68 is provided, having two inputs which are connected, respectively, to an output of the amplifier 64 and to an output of the attenuator 66, such that the first and second selector switches 62, 68 are operative to select either amplification or attenuation of a signal input to the second gain stage 60. Again, however, the attenuator 66 could be replaced by a simple conductor, such that the amplifier 64 may be bypassed by appropriate configuration of the first and second selector switches 62, 68.

Each of the plurality of transmit paths 22 includes an isolator 70, to permit the transmit path 22 to be disabled, to prevent signal propagation from the signal generator 14 to a device under test 18.

The isolator 70 includes a selector switch 72 having two inputs and one output. One of the inputs is connected to an output of the second gain stage 60, and the other is connected, via a 50 ohm termination 74, to ground. The output of the selector switch 72 is connected to an output of the isolator 70, which in turn is connected to an input of one of the plurality of duplex combiners 24.

In normal, enabled, operation of the transmit path 22, the selector switch is set to the position shown in FIG. 2, in which a signal conduction path is provided from the input of the isolator 70 to its output, to enable a transmission of a signal through the isolator 70 to the relevant one of the plurality of duplex combiners 24.

In order to disable the transmit path 22, the selector switch 72 is moved to a disabled position in which its input is connected to the 50 ohm termination 74. In this configuration there is no conduction path from the input of the isolator 70 to its output, and so signal propagation through the transmit path 22 to the duplex combiner 24 is not possible. Since in this configuration the selector switch 72 provides a conduction path from the output of the isolator 70 to the 50 ohm termination 74, any signal transmitted by the DUT 18 connected to the duplex combiner 24 to which the disabled transmit path 22 is connected will be absorbed by the 50 ohm termination 74, thereby helping to prevent spurious signals from affecting test results.

It will be appreciated that the selectable amplifiers 54, 64 and attenuators 56, 66 in each of the plurality of transmit paths 22 enable coarse level control of the gain of each transmit path 22, whilst the fine level control 40 permits fine level adjustments to the gain of each individual transmit path 22.

The amplifiers 54, 64 and attenuators 56, 66 of the first and second gain stages 50, 60 also play a role in maintaining electrical isolation between the DUTs 18. When an attenuator 56, 66 is selected, the isolation between DUTs 18 is improved by the additional insertion loss introduced into the relevant transmit path 22 by the attenuator 56, 66. When an amplifier 54, 64 is selected the isolation between DUTs 18 is not significantly reduced, as the reverse loss of a selected amplifier 54, 64 in one of the plurality of transmit paths 22 is greater than the forward gain of a selected amplifier 54, 64 in another of the plurality of transmit paths 22, and thus there is a net loss in the transmit paths 22, leading to improved isolation between the DUTs 18.

Figure 3:
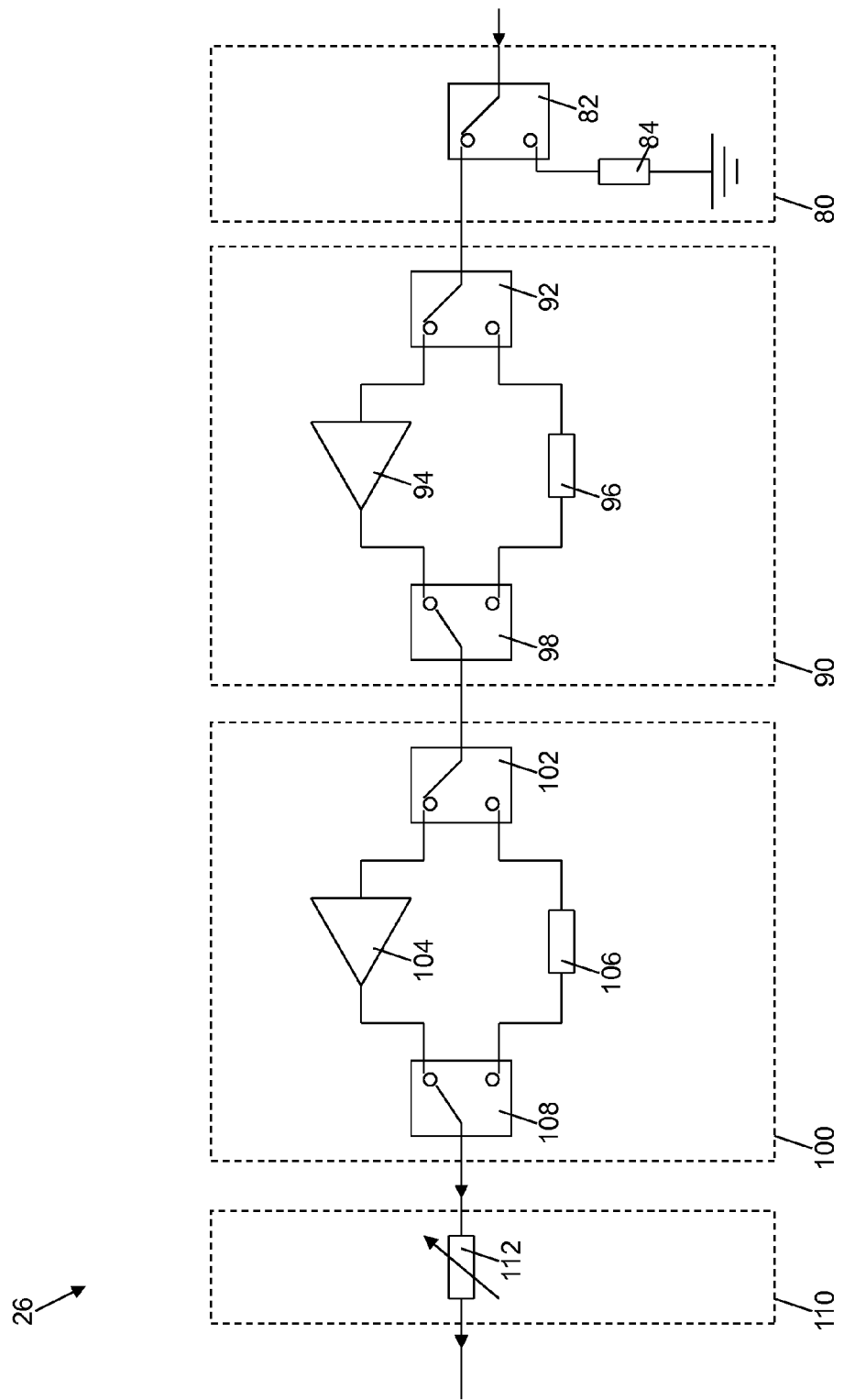
FIG. 3 is a schematic representation of a receive path of the signal combining apparatus used in the system illustrated in FIG. 1.

Referring now to FIG. 3, an exemplary receive path is shown generally at 26. In this example, the receive path is made up of an isolator 80, a first gain stage 90, a second gain stage 100 and a fine level control 110.

The isolator 80 provides a means for disabling the receive path 26 to prevent transmission of signals along the receive path 26. The isolator includes a selector switch 82 which has two outputs, one of which is connected to the output of the isolator 80, and the other of which is connected to a 50 ohm termination 84, which is in turn connected to ground. The selector switch 82 has a single input, which is connected to an input of the isolator 80, which in turn is connected to the output port of one of the plurality of duplex combiners 24.

In normal, enabled, operation of the receive path 26, the selector switch 82 is set to the position shown in FIG. 3, in which a signal conduction path is provided from the input of the isolator 80 to its output, to enable a transmission of a signal through the one of the plurality of receive paths 26 to which the isolator 80 belongs.

In order to disable the receive path 26, the selector switch 82 is moved to a disabled position in which its input is connected to the 50 ohm termination 84. In this configuration there is no conduction path from the input of the isolator 80 to its output, and so signal propagation through the receive path 26. Since in this configuration the selector switch 82 provides a conduction path from the output of the isolator 80 to the 50 ohm termination 84, any signal transmitted by the DUT 18 connected to the duplex combiner 24 to which the disabled receive path 26 is connected will be absorbed by the 50 ohm termination 84.

The first gain stage 90 includes a first selector switch 92 having a single input and two outputs. The input is connected to the output of the isolator 80. One of the outputs is connected to an input of an amplifier 94, whilst the other output is connected to an input of an attenuator 96.

The first gain stage 90 further includes a second selector switch 98, which has two inputs and one output, one input being connected to an output of the amplifier 94 and the other input being connected to an output of the attenuator 96.

The first and second selector switches 92, 98 are operative selectively to connect the input of the first gain stage 90 to either the amplifier 94 or the attenuator 96, such that the input signal is either amplified or attenuated by the first gain stage 90. In some embodiments, however, the attenuator is omitted, and in its place is a simple conductor, such that the first and second selector switches 92, 98 are operative to cause the input signal to be amplified by the amplifier 94 or else simply to bypass the amplifier 94.

The second gain stage 100 in this example takes the same form as the first gain stage 90, having a first selector switch 102 which has an input that is connected to an input of the second gain stage 100, and two outputs which are connected, respectively, to inputs of an amplifier 104 and an attenuator 106. A second selector switch 108 is provided, having two inputs which are connected, respectively, to an output of the amplifier 104 and to an output of the attenuator 106, such that the first and second selector switches 102, 108 are operative to select either amplification or attenuation of a signal input to the second gain stage 100. Again, however, the attenuator 106 could be replaced by a simple conductor, such that the amplifier 104 may be bypassed by appropriate configuration of the first and second selector switches 102, 108.

The fine level control 110 of each of the plurality of receive paths 26 includes a variable attenuator 112, which permits individual fine level adjustment of the gain of the receive path 26, to ensure that the signal level at the output of each of the plurality of receive paths 26 is the same, and thus that the signal level received by the signal analyser 16 is the same for each signal. It will be appreciated, however, that the fine level control 110 may be omitted from the plurality of receive paths 26 if post-processing can be performed on the measurements made by the signal analyser 16 on the composite signal output by the signal relay 28.

It will be appreciated that the selectable amplifiers 94, 104 and attenuators 96, 106 in each of the plurality of receive paths 26 enable coarse level control of the gain of each receive path 26, whilst the fine level control 110 permits fine level adjustments to the gain of each individual receive path 26.

The amplifiers 94, 104 and attenuators 96, 106 of the first and second gain stages 90, 100 also play a role in maintaining electrical isolation between the DUTs 18. When an attenuator 96, 106 is selected, the isolation between DUTs 18 is improved by the additional insertion loss introduced into the relevant receive path 26 by the attenuator 96, 106. When an amplifier 94, 104 is selected the isolation between DUTs 18 is not significantly reduced, as the reverse loss of a selected amplifier 94, 104 in one of the plurality of receive paths 26 is greater than the forward gain of a selected amplifier 94, 104 in another of the plurality of receive paths 26, and thus there is a net loss in the receive paths 26, leading to improved isolation between the DUTs 18.

The RF combiner 12, when used in conjunction with a suitable signal generator 14 and a suitable signal analyser 16 permits simultaneous testing of a plurality of different DUTs 18, with different configurations of the plurality of transmit and receive paths 22, 26 providing different test functionality.

Figure 4:
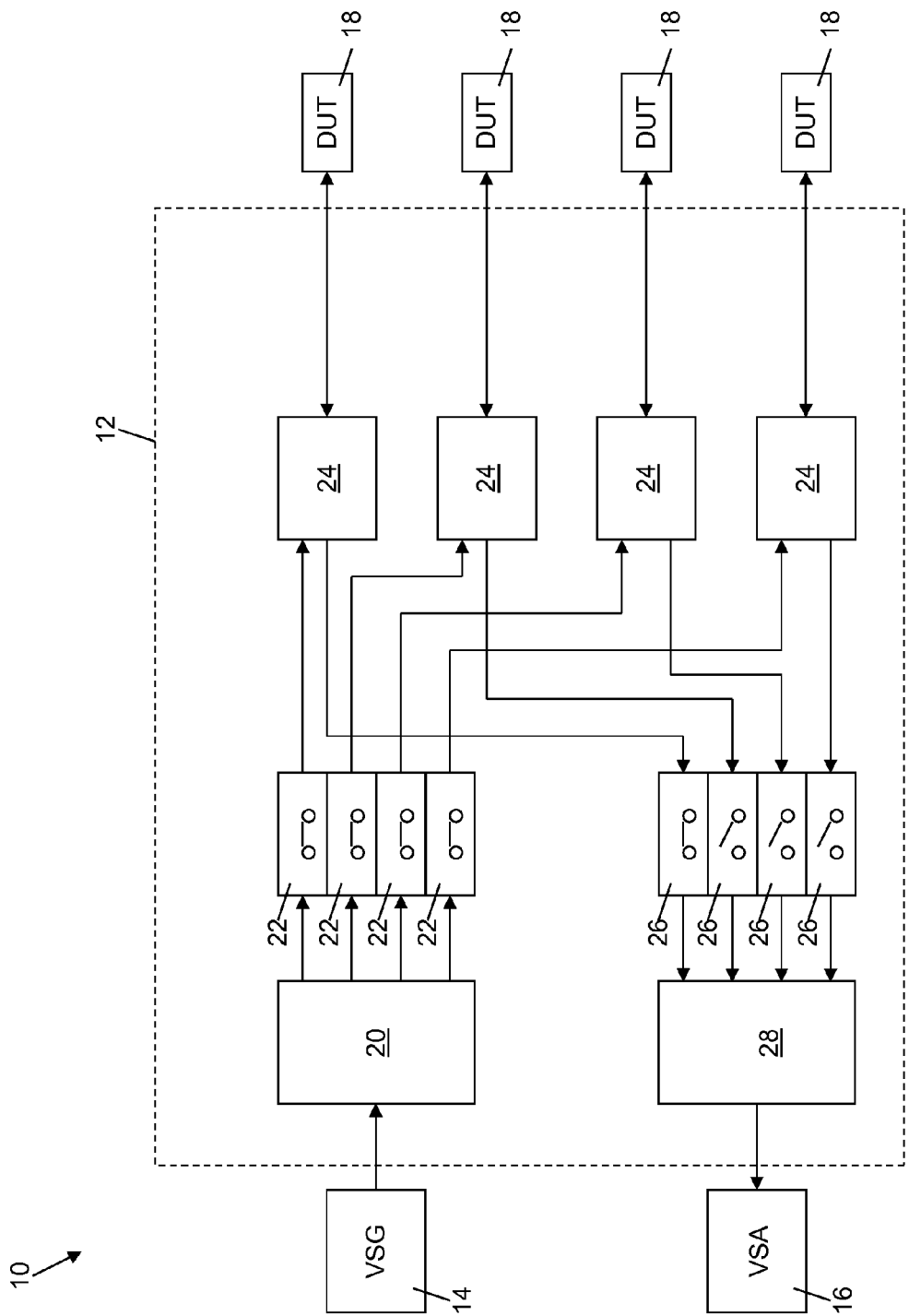
FIG. 4 is a schematic representation of an exemplary configuration of the signal combining apparatus of FIG. 1 for simultaneously testing a plurality of devices.

For example, FIG. 4 is a schematic representation of a configuration that can be used for sequentially testing the uplink performance of a plurality of DUTs 18 that receive a broadcast downlink signal from a signal generator 14.

In the configuration illustrated in FIG. 4, each of the plurality of transmit paths 22 is enabled, such that a signal generated by the signal generator 14, which may simulate, for example, a downlink signal for a mobile telephone, is split by the splitter 20 and transmitted by each of the plurality of transmit paths 22 to each of the plurality of duplex combiners 24, and onward to each of the plurality of DUTs 18, which may be, for example, mobile telephones. Thus, the signal generated by the signal generator 14 is broadcast to all of the DUTs 18.

Each of the plurality of receive paths 26 is enabled in a predetermined sequence, such that a signal received from each DUT 18 (which may be, for example, an uplink signal, where the DUTs 18 are mobile telephones) can be received and analysed by the signal analyser 16 in turn. This configuration is useful where each DUT 18 is expected to produce a signal (e.g. an uplink signal) in the same frequency band. If each DUT 18 is expected to produce a signal in a different frequency band, the configuration illustrated in FIG. 4 can be modified to enable all of the receive paths 26 to be enabled simultaneously, such that the signals from the DUTs 18 can be received and analysed by the signal analyser 16 simultaneously, provided that the analysis bandwidth of the signal analyser is sufficient.

Figure 5:
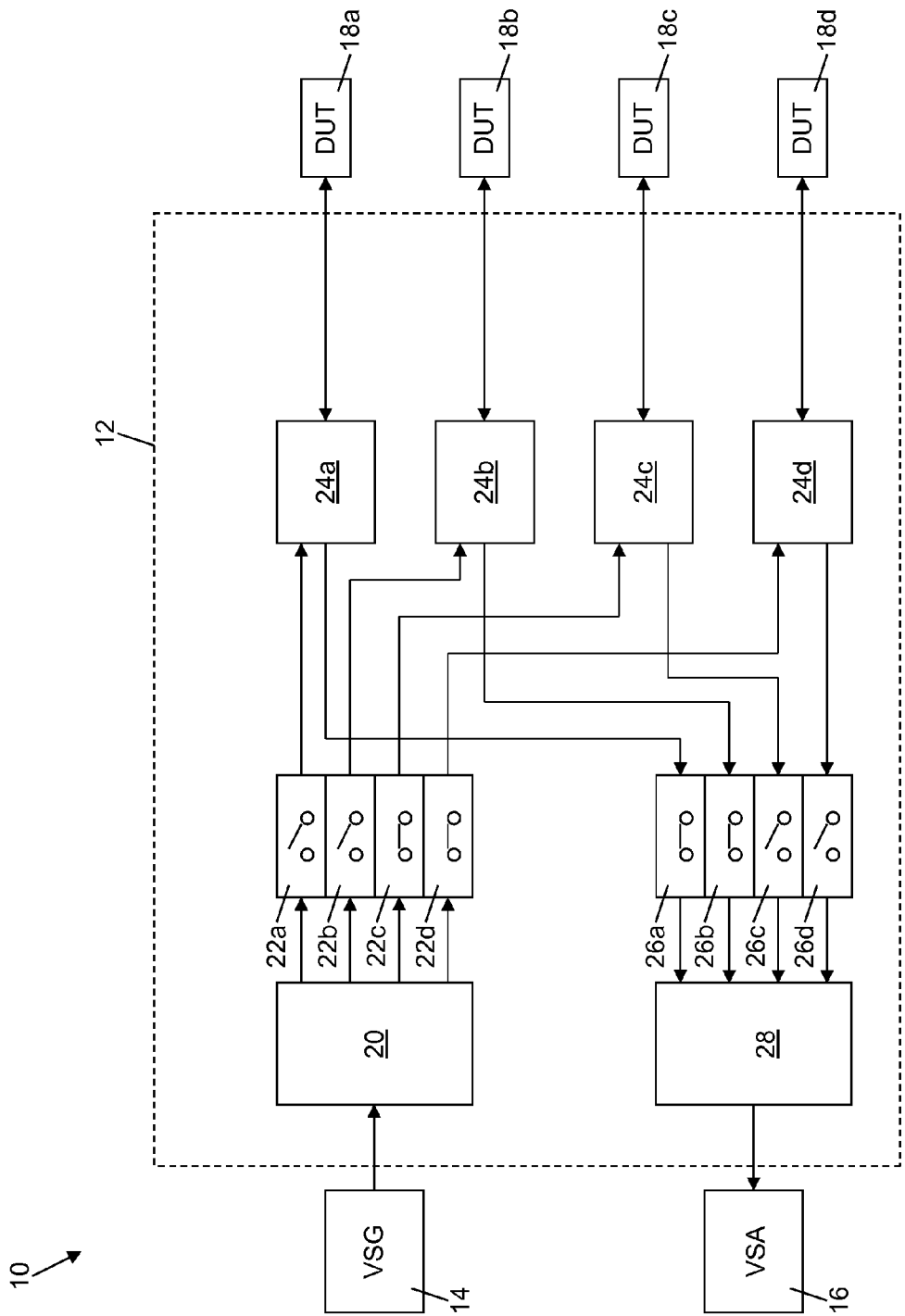
FIG. 5 is an alternative representation of an exemplary configuration of the signal combining apparatus of FIG. 1 for simultaneously testing a plurality of devices.

FIG. 5 is a schematic representation of a configuration that can be used to test the uplink performance of one DUT 18 whilst the downlink performance of another DUT is tested. This is sometimes referred to as "ping-pong" testing.

In the configuration illustrated in FIG. 5, the lower two transmit paths 22c, 22d are enabled and the lower two receive paths 26c, 26d are disabled at the same time. These transmit and receive paths 22c, 22d, 26c, 26d are connected to DUTS 18c, 18d (via duplex combiners 24c, 24d), and so in this configuration a downlink signal is being transmitted to DUTs 18c, 18d to test the downlink performance of DUTS 18c, 18d.

At the same time, the upper two transmit paths 22a, 22b are disabled and the upper two receive paths 26a, 26b are enabled, providing an uplink signal path from DUTs 18a, 18b (via duplex combiners 24a, 24b) to the signal analyser 16. Thus, in this configuration an uplink signal is being transmitted by the DUTs 18a, 18b to the signal analyser 16 to test the uplink performance of DUTs 18a, 18b at the same time as the downlink performance of DUTs 18c, 18d is being tested. Once the tests have been completed the transmit and receive paths 22, 26 can be reversed so that the uplink performance of DUTs 18c, 18d and the downlink performance of DUTs 18a, 18b can be tested simultaneously. In this way, the signal generator 14 and signal analyser 16 resources can be used efficiently.

In some embodiments, the RF combiner 12 may have a switchable feedback path between the transmit paths 22 and the receive paths 26. This is illustrated schematically in FIG. 6.

Figure 6:
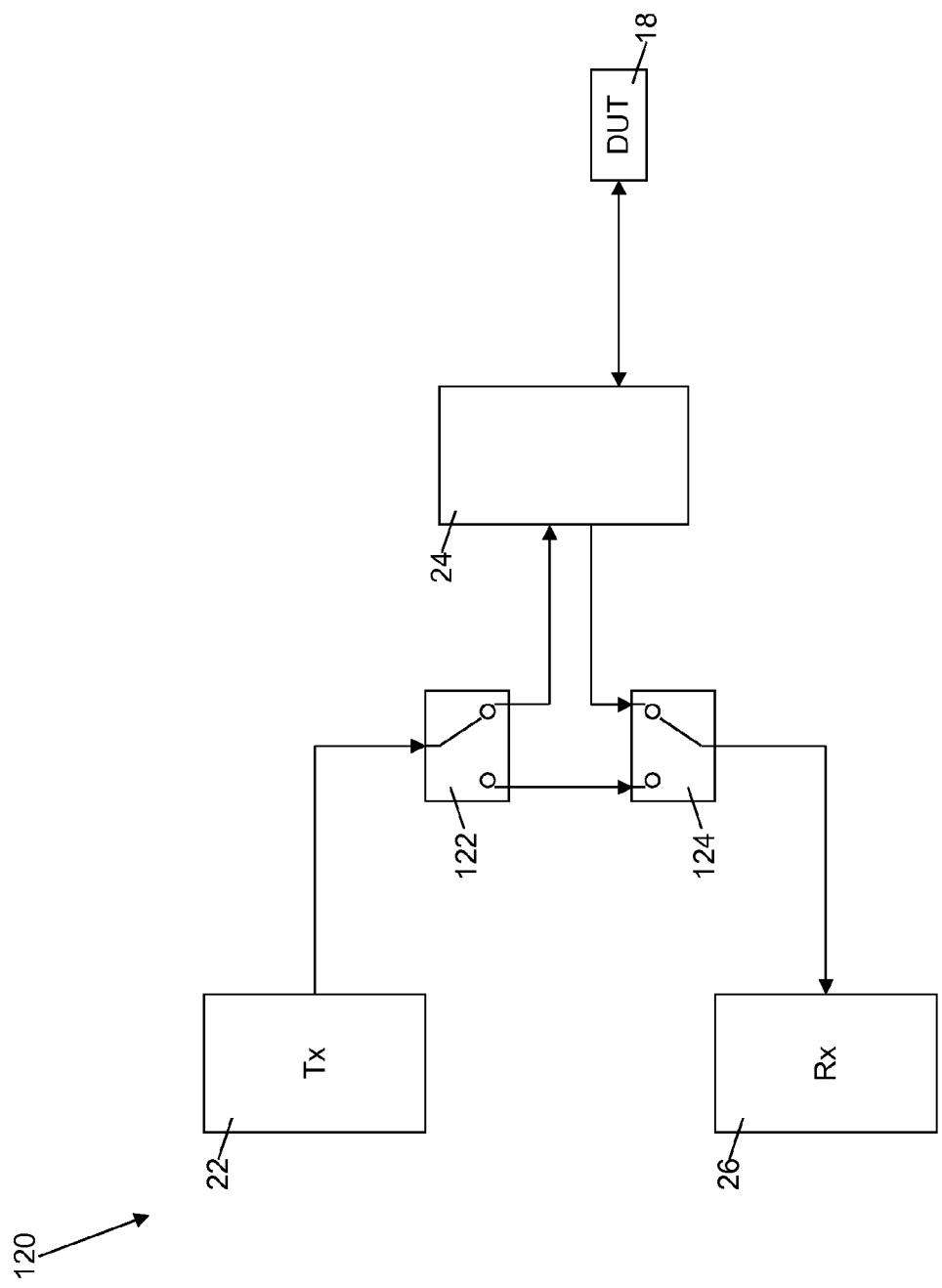
FIG. 6 is a schematic representation of a feedback path that may be implemented between a transmit path as illustrated in FIG. 2 and a receive path as illustrated in FIG. 3.

The switchable feedback path is shown generally at 120 in FIG. 6, and comprises a first switch 122 and a second switch 124. The first switch 122 has a single input which is connected to the output of one of the plurality of transmit paths 22. The first switch 122 has two outputs, one of which is connected to the input of one of the plurality of duplex combiners 24, and the other of which is connected to one of two inputs of the second switch 124. The other input of the second switch 124 is connected to the output of the duplex combiner 24 to which the first switch 122 is connected. The second switch 124 has a single output, which is connected to the input of one of the plurality of receive paths 26.

In the configuration shown in FIG. 6, the first and second switches 122, 124 provide a direct path from the transmit path 22 to the receive path 26. Thus, a signal generated by the signal generator 14 will pass through the transmit path 22, the feedback path 120 and the receive path 26 to the signal analyser 26. This permits errors in the system 10 to be identified and corrected.

It will be appreciated that it is important to be able to distinguish errors caused by the signal generator 14 and/or the transmit path 22 from errors caused by the signal analyser 16 and/or receive path 26.

One way of doing this is to use a power sensor at the final output of each of the plurality of transmit paths 22.

The power sensor can be used to measure the level accuracy of the transmit path 22 and signal generator 14, by comparing the measured power at the output of the transmit path to the indicated power of the signal output by the signal generator 14. The level accuracy of the transmit path and signal generator 14 can then be subtracted from the level accuracy of the path from the signal generator 14 to the signal analyser 16 (which is calculated by comparing the indicated power of the signal output by the signal generator 14 to the measured power at the signal analyser 16) to obtain a value for the level accuracy of the receive path 26 and signal analyser 16.

Any suitable power sensor may be used for this purpose. For example, the power sensor may be based on a Schottky diode detector with a capacitor, but those skilled in the art will be aware of other suitable power sensors.

To ensure that the power sensor is not affected by temperature changes it may be maintained at a constant temperature by heating means. For example, the power sensor may be disposed within an oven. This may be implemented in a planar environment such as a printed circuit board (PCB) by routing around the ovened section of the PCB. As conduction is the primary heat transfer mechanism in a PCB the air gap formed by the routing around the ovened section of the PCB thermally insulates the ovened section from surrounding sections of PCB.

The ovened power sensor may be connected directly to the transmit path 22, or may form part of the feedback path 120, as will be described below with reference to FIG. 7. If the power sensor is connected directly to the transmit path 22 the coupling factor must be low so that the power sensor does not cause significant losses in the signal transmitted though the transmit path 22. This requires an unequal power split, meaning that the power sensor may have to have high sensitivity to overcome the coupling loss.

Figure 7:
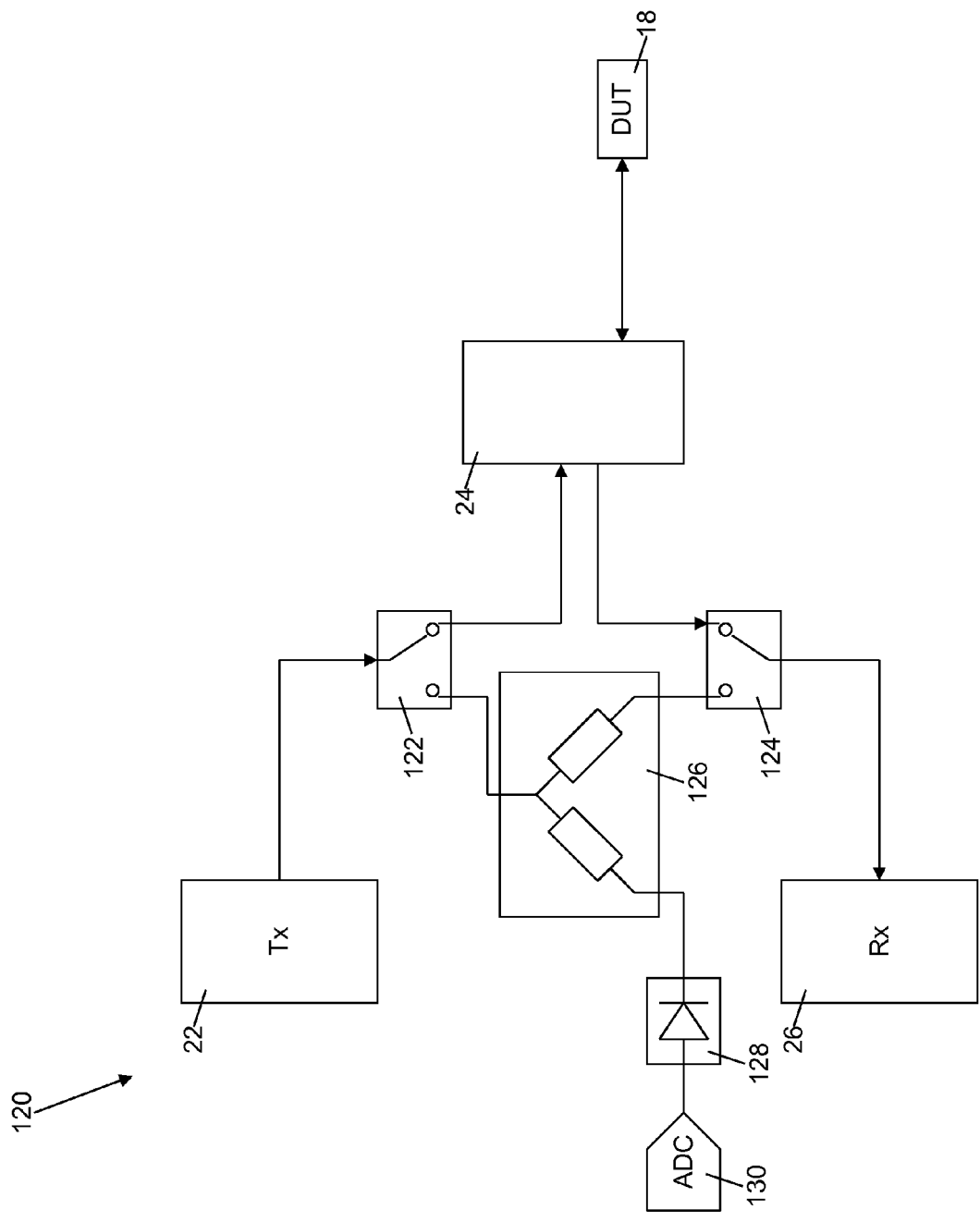
FIG. 7 is a schematic representation illustrating a power sensor in the feedback path illustrated in FIG. 6.

FIG. 7 is a schematic representation of the feedback path 120 incorporating a power detector, as discussed above. As can be seen in FIG. 7, a power splitter 126 is connected in the feedback path and is operative to split the power of the signal from the transmit path 22 between the receive path 26 and a power sensor 128, which has an analogue output that is connected to an input of an analogue to digital converter (ADC) 130, which provides a digital signal indicative of the analogue voltage output of the power sensor, which represents the measured power at the power sensor 128.

By placing the power sensor 128 in the feedback path in this way the extra insertion loss associated with the power sensor 128 can be tolerated, so a much higher coupling factor between the power sensor 128 and the transmit path 22 can be used.

To ensure that the measured power at the power sensor 128 is not affected by the receive path 26 it is necessary to be able to disable the connection between the power sensor 128 and the receive path 26. This can be achieved by using the selector switch 82 in the receive path 26 to disable the receive path and connect the transmit path 22 to the 50 ohm termination 84. This has the effect of providing a highly repeatable termination for the transmit path 22 whilst disconnecting the receive path 26.

The level stability of the duplex combiner 24 is very good, as it is a passive component. However, the level stability of the amplifiers 54, 64, 94, 104 in the transmit and receive paths 22, 26 and the level stability of the signal generator 14 and the signal analyser 16 may be much worse. Thus, the duplex combiner 24 and the switching of the feedback path 120 has a negligible effect on the level accuracy compared with that of the amplifiers 54, 64, 94, 104, the signal generator 14 and the signal analyser 16.

Figure 8:
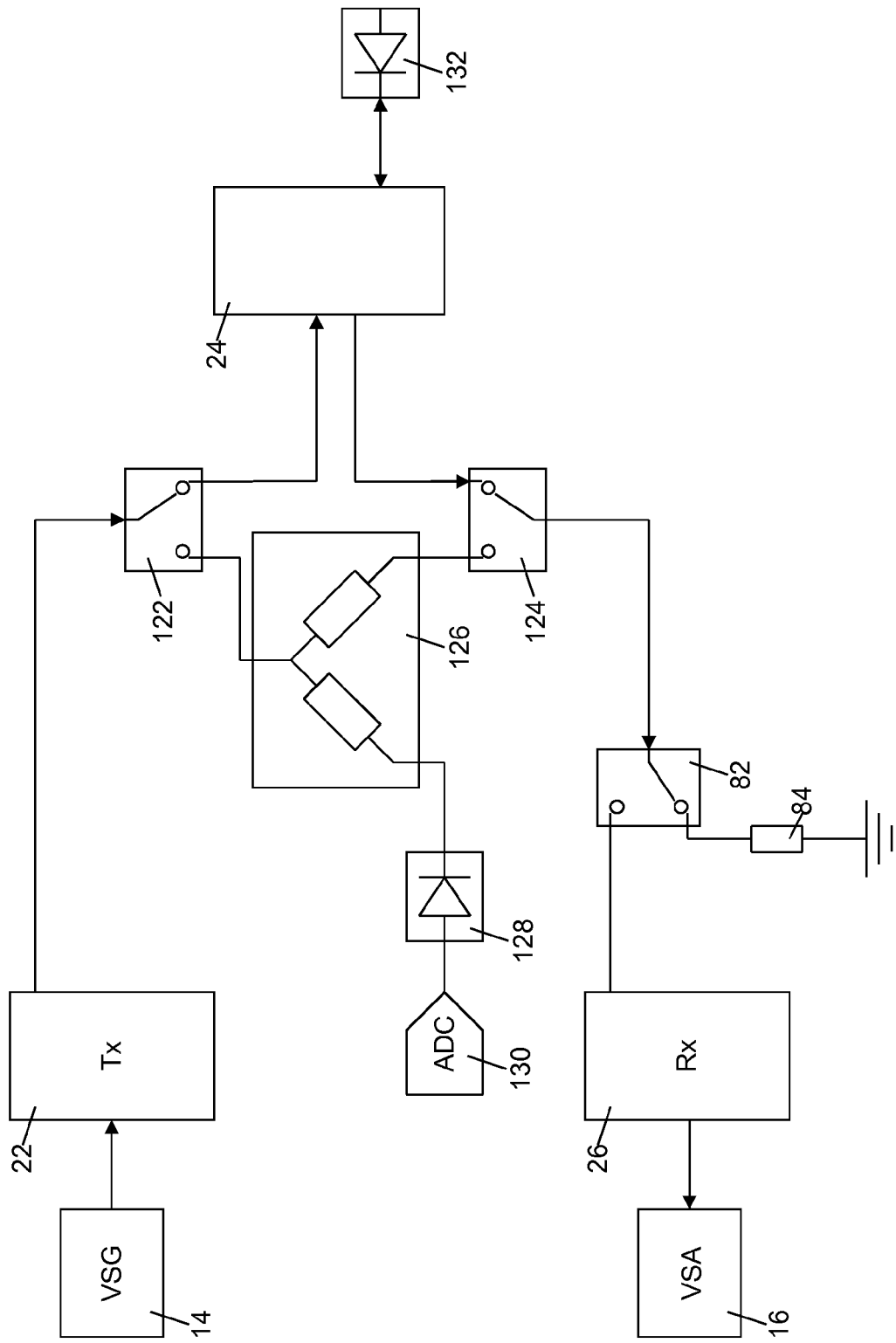
FIGS. 8 to 10 are schematic representations illustrating steps taken during a method for calibrating the signal combining apparatus used in the system of FIG. 1.

A method for calibrating the RF combiner 12 will now be described with reference to FIGS. 8, 9 and 10.

In a first step, the signal generator 14 is set to a known output level. An external measuring device such as a calibrated power sensor 132 is connected to one of the plurality of test ports of the RF combiner 12, and the output of the signal generator 14 is connected to the input port of the RF combiner 12. The appropriate transmit path 22 is selected and enabled as described above such that a signal path exists between the signal generator 14 and the external measuring device 132, such that the external measuring device 132 can make a measurement of the power of the signal in the transmit path 22. As is shown in FIG. 8, the selector switch 82 of the receive path 26 is set to terminate in the 50 ohm termination 84, to ensure that the measured power at the external measuring device 132 is not affected by the receive path 26.

Figure 9:
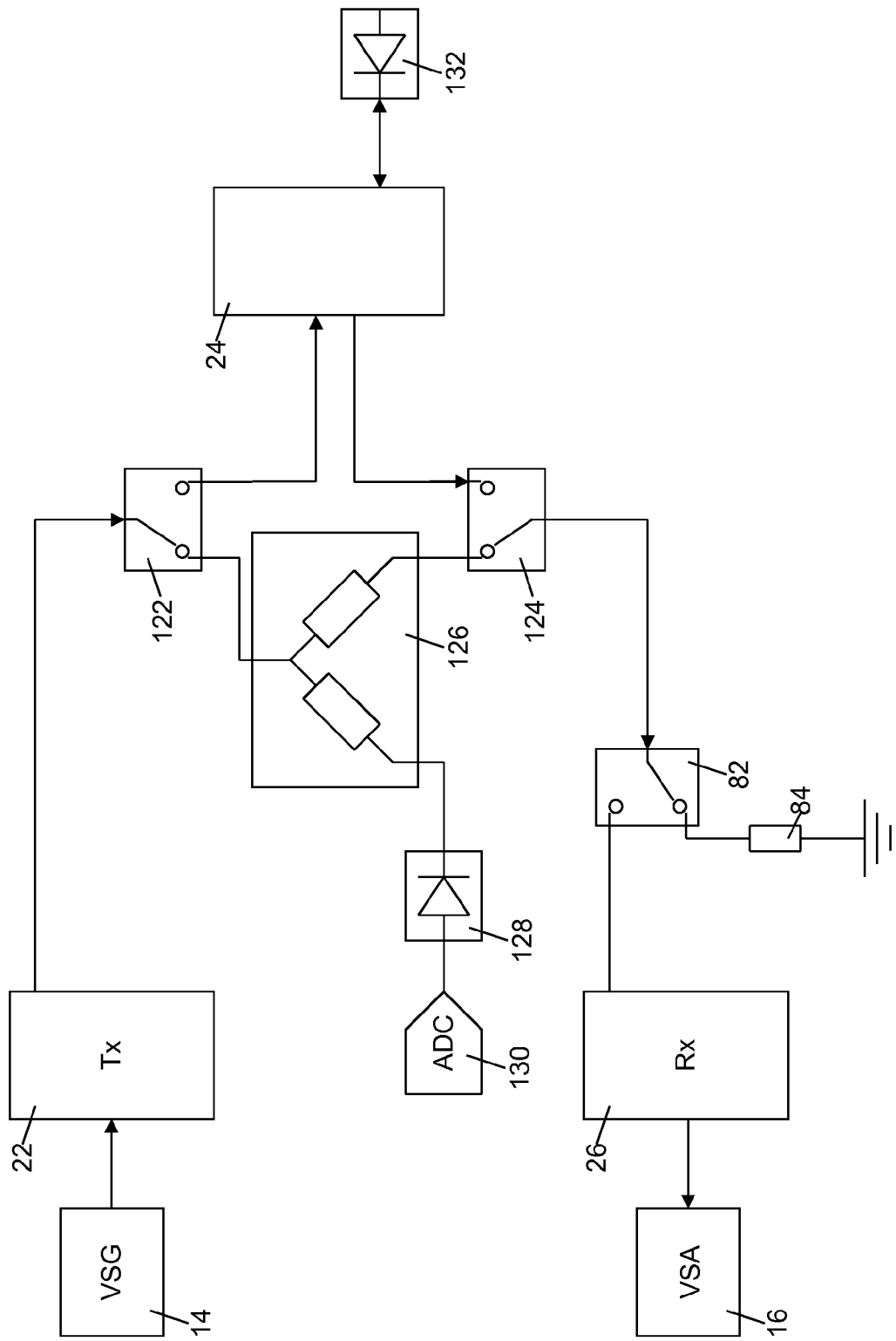
Figure 10:
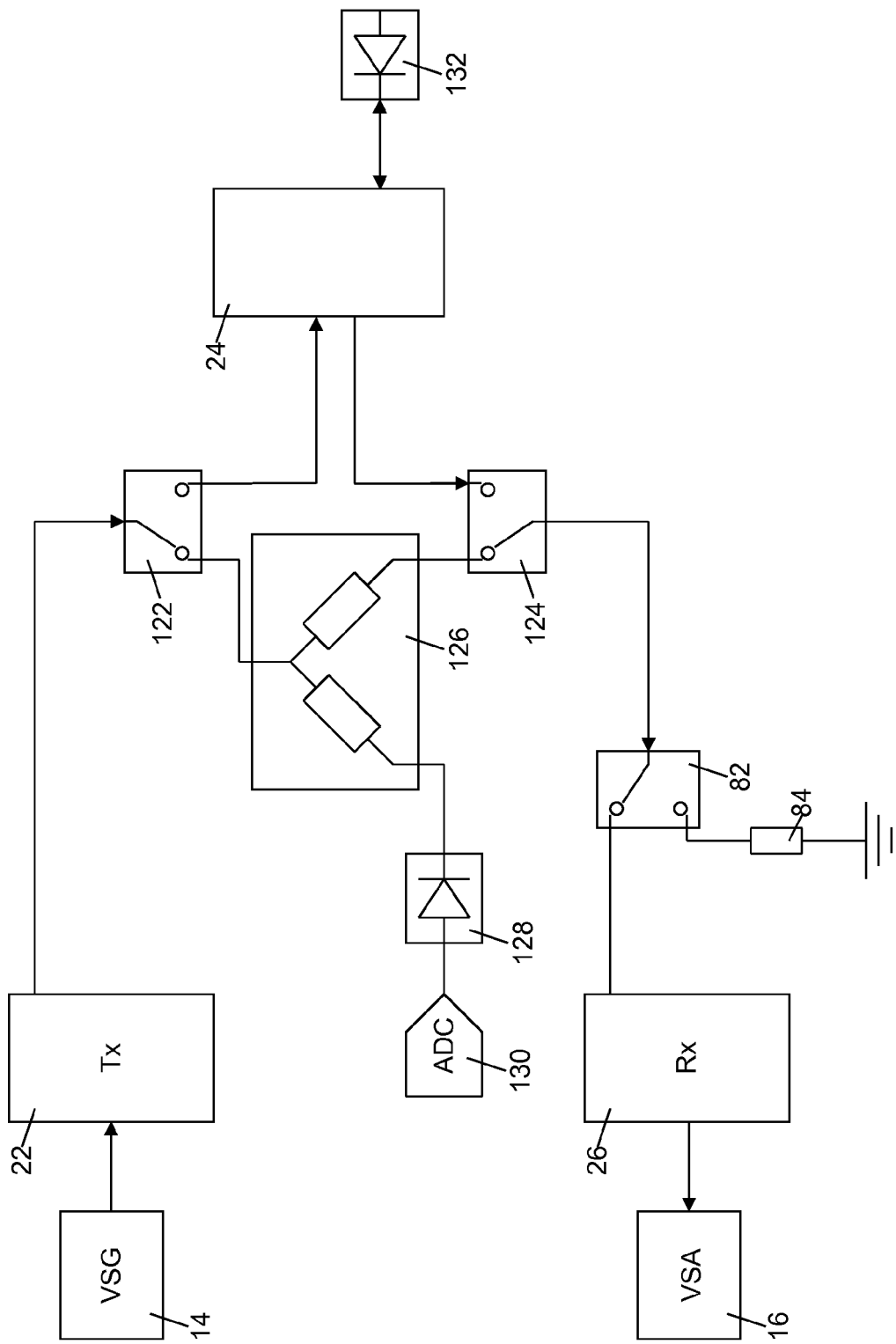

The selector switches 122, 124 are then moved to the position shown in FIG. 9, to insert the power sensor 128 into the feedback path 120, so that an internal measurement of the power in the transmit path 22 may be taken. The analogue voltage output by the power sensor 128 is digitised by the ADC 130 and stored for later use. As before, the selector switch 82 of the receive path 26 is set to terminate in the 50 ohm termination 84, to ensure that the measured power at the power sensor 128 is not affected by the receive path 26.

The power measurement taken by the internal power sensor 128 is correlated with the power measurement taken by the external measuring device 132. Because the duplex combiner 24 is a passive component the relationship between the measurements taken by the internal power sensor 128 and the external measuring device 132 is very stable.

The power measurement taken by the internal power sensor 128 is stored in the RF combiner 12 as a target value for use in future self calibrations of the transmit paths 22 of the RF combiner 12. For example, a change in conditions, such as a change in the ambient temperature in which the RF combiner is operating may necessitate re-calibration of the transmit paths 22. In this case, no external measuring device 132 is necessary. Instead, the stored correlated value is used as a target. The RF combiner 12 is set to the same configuration as used in the initial calibration, and the signal generator 14 is used to transmit a signal with the power level used in the initial calibration. If the power level measured by the power sensor 128 is not equal to the target stored power level, the fine level control 40 of the transmit path 22 can be adjusted to adjust the path loss of the transmit path until the target power level is achieved.

To re-establish the target power a Newton-Rapheson search can be used. This is faster than a simple binary search which would decide if the target is higher or lower than the current level. A Newton-Rapheson search relies on the fact that the digitised reading produced by the ADC 130 allows the magnitude of the difference to be measured so the algorithm can quickly reduce this difference.

By assuming negligible drift or temperature coefficient level errors due to the feedback switches 122, 124 or duplex combiner 24 it is possible to ensure that if the target power is measured the incident power to the DUT will be the same as during the initial transmit path 22 measurement.

To calibrate a receive path 26 it is first necessary to have a calibrated transmit path 22. When the transmit path 22 has been calibrated it can be routed to the receive path by using the feedback path 120 and setting the receive path selector switch 82 to the non-terminated state, as shown in FIG. 10.

The signal level of the transmit path 22 is at a repeatable level by virtue of having been self-calibrated. This level is routed through the receive path 26 to the signal analyser 16, which measures the level. If performing an initial calibration the measured level is stored for later use.

During subsequent self-calibrations, once the transmit path level is re-established the level measured by the signal analyser 16 is compared to the stored value. Any changes between the new level measured by the signal analyser 16 and stored signal analyser readings can either be compensated by the fine level controls 110 of the receive paths 26, if fitted, or by post-processing the new level measurements of the signal analyser 16 to include any offset.

Even when the receive paths 26 have been self-calibrated in the manner described above, level errors are still possible. For example, it can be difficult to measure some signal modulation schemes which use burst signals with high on/off power ratios, such as TD-SCDMA (Time Division Synchronous Code Division Multiple Access).

Power bursts are usually tested against a mask to ensure that the power is within acceptable limits. Any level errors in the test equipment will reduce the yield of the devices under test, so it is important to maintain level accuracy.

Measuring the burst "off" power requires a sensitive receive path 26, but the receive path 26 must also be able to cope with frequent high power burst "on" powers. It is usually possible to measure the burst in two parts and "stitch" the high and low level measurements together using digital post processing.

The high burst power can cause the amplifiers 94, 104 in the receive path 26 to overload. The amplifiers 94, 104 will typically operate in a linear class-A bias condition for best performance.

When overloaded, the amplifier 94, 104 is pushed into saturation and is no longer operating in a linear manner. The amplifier's bias current will drop as it is operating in a more power efficient mode. This causes the amplifier 94, 104 to cool down due to the reduced power dissipation.

As the burst enters the "off" period the amplifier 94, 104 reverts to linear operation, the bias increases and the amplifier 94, 104 heats up. The amplifier gain will have a non-zero temperature co-efficient, so as it warms up there will be a level error in the "off" power measurement.

To avoid saturation of the amplifier 94, 104, a limiter circuit may be implemented using a schottky diode as a clipper or a PIN diode as a limiter. However, these may introduce unwanted distortion and often do not have a sharp enough limiting action. This can lead to the situation where the limiting starts to occur well before it is required and the level accuracy of the signal is affected.

To reduce the level error caused by the burst "on" power, a switchable attenuation can be used prior to the amplifiers 94, 104 to keep them operating linearly. This will not introduce unwanted distortion like a diode based limiter and can have a very sharp response.

An exemplary embodiment of such a switchable attenuation is shown generally at 140 in FIG. 11, and will be described below.

Figure 11:
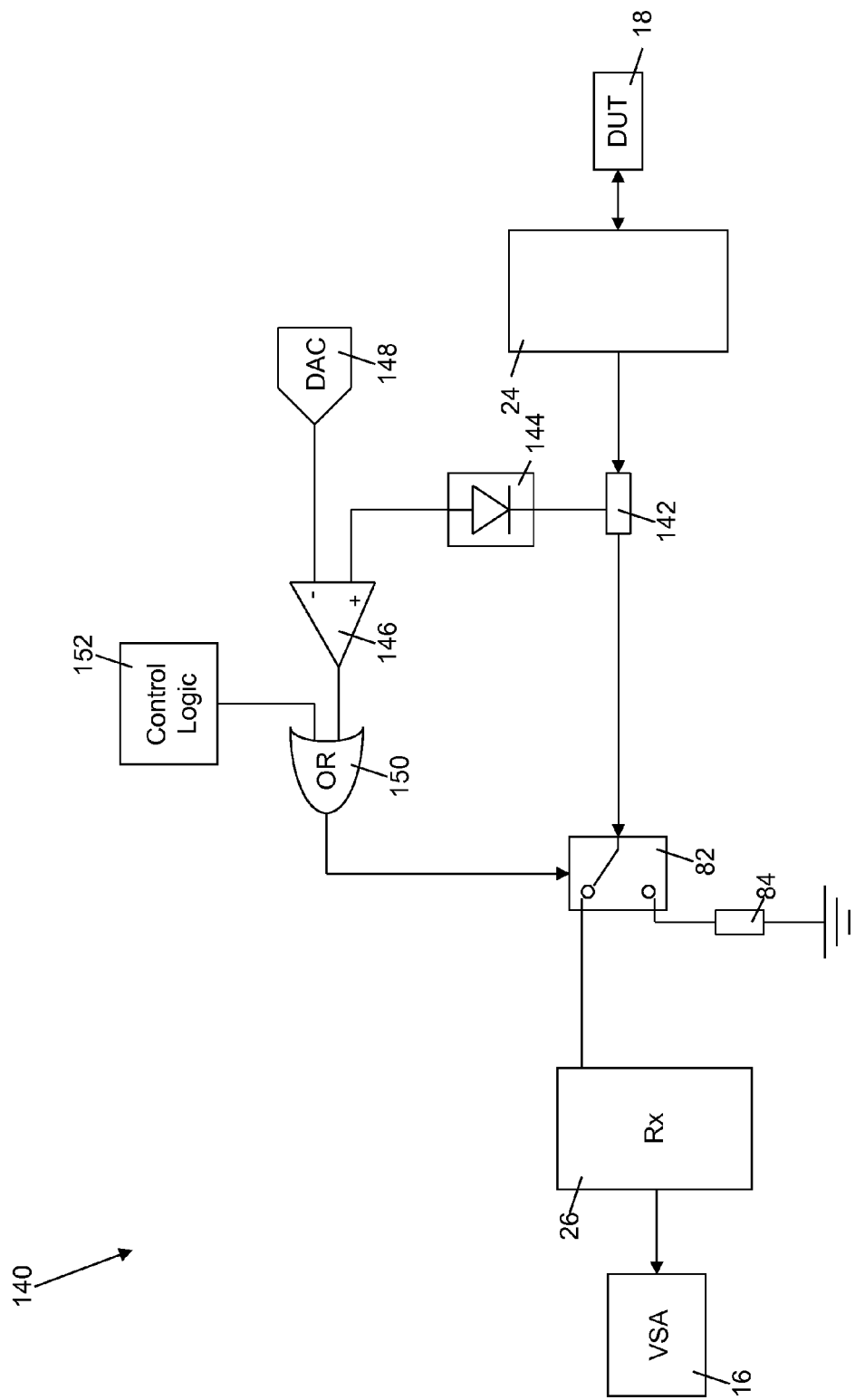
FIG. 11 is a schematic representation of an overload protection system for the receive path illustrated in FIG. 3.

In the embodiment illustrated in FIG. 11, an RF coupling 142 couples an RF power sensor 144 to the output of one of the plurality of duplex combiners 24, such that an RF signal received from a DUT 18 connected to the test port associated with the duplex combiner 24 is coupled to the power detector 144.

An output of the power detector 144 is connected to a first input of a threshold detector 146, which has a second input that is connected to an output of a digital to analogue converter (DAC) 148. The digital to analogue converter 148 receives a digital threshold value and converts it to an analogue voltage which is compared to voltage output by the power detector 144 by the threshold detector 146.

An output of the threshold detector 146 is connected to a first input of a two input OR gate 150. The second input of the two input OR gate is connected to a control logic circuit 152. The output of the two input OR gate controls the selector switch 82 of the isolator 80 of one of the plurality of receive paths 26.

If the voltage output by the power detector 144 exceeds the threshold set by the output of the DAC 148, the threshold detector 146 outputs a logic high signal to the first input of the OR gate 150. This causes the output of the OR gate 150 to go high, which in turn causes the selector switch 82 of the isolator 80 to switch to the termination position in which the receive path 26 is terminated by the 50 ohm termination 84. Similarly, if the control logic circuit 152 outputs a logic high signal to the second input of the OR gate 150 the output of the OR gate 150 goes high, causing the selector switch 82 to switch to the termination position, terminating the receive path 26 at the 50 ohm termination 84.

In this way, when a burst power that would overload the amplifiers 94, 104 in the receive path 26 is detected, the receive path 26 can be disabled by enabling the 50 ohm termination 84, thereby protecting the amplifiers 94, 104 and preventing overloading. This ensures that there is no loss of amplifier linearity when during the burst "off" period, as the temperature of the amplifiers 94, 104 remains constant.

The threshold level can be set to an appropriate level based on the gain setting of the receive path. To disable the system 140 of FIG. 11 the threshold can be set to an excessively high level, although disconnecting the threshold detector 146 from the selector switch 82 is preferable.

By disabling the threshold detector 146 its output cannot control the selector switch 82. However, it is still possible to set a threshold and monitor the output of the threshold detector 146. This could be used during broadcast uplink measurements, for example, to show which DUT 18 is producing an abnormally high level which may cause the signal analyser 16 to overload, thus causing erroneous measurements on all DUTs 18. The receive path 26 of the suspected DUT 18 could be disabled and the measurement repeated on the remaining DUTs 18 to improve test yield.

An alternative to the system 140 illustrated in FIG. 11 is to synchronise switching of the selector switch 82 with the modulation scheme of the DUT 18. However, this requires knowledge of the modulation scheme or synchronisation with the DUT 18. In contrast, the system 140 illustrated in FIG. 11 is much easier to implement, as it requires no knowledge of the modulation scheme or synchronisation with the DUT 18. In a manufacturing environment a faulty DUT 18 may not synchronise or may get stuck in the burst on state. Using the system 140 illustrated in FIG. 11 level errors due to "thermal tails" (i.e. changes in the temperature of the amplifiers 94, 104) are automatically eliminated even in these unexpected states.

What is claimed is:

1. A radio frequency (RF) signal combining apparatus comprising:
   an input port for receiving an input signal from a signal generator;
   an output port for outputting a signal to a signal analyser;
   a plurality of test ports for connecting the apparatus to a plurality of devices under test (DUTs), the apparatus further comprising:
   a splitter for dividing a signal received at the input port into a plurality of signals;
   a plurality of transmit signal paths, each of the plurality of transmit signal paths comprising a switchable gain stage, the switchable gain stage comprising an amplifier and an attenuator and being operative selectively to connect an input of the gain stage to either the amplifier or the attenuator, such that the input signal is either amplified or attenuated by the gain stage;
   a plurality of receive paths;
   a signal relay, the signal relay being configured to receive one or more signals through one or more of the plurality of receive paths and to output a single composite signal to the output port, the single composite signal output to the output port containing the signals received from the one or more of the plurality of receive paths wherein the apparatus further comprises a plurality of duplex combiners which are each configured to:
   receive a signal from one of the plurality of transmit paths;
   transmit the signal from the one of the plurality of transmit paths to one of the plurality of test ports;
   receive a signal from one of the plurality of test ports; and
   transmit the signal received from the one of the plurality of test ports to one of the plurality of receive paths.

2. The signal combining apparatus according to claim 1 wherein the plurality of receive paths each comprise a switchable gain stage.

3. The signal combining apparatus according to claim 1 wherein each of the plurality of transmit paths comprises a fine level control.

4. The signal combining apparatus according to claim 1 wherein each of the plurality of receive paths comprises a fine level control.

5. The signal combining apparatus according to claim 3 wherein the fine level control comprises a variable attenuator.

6. The signal combining apparatus according to claim 1 wherein each of the plurality of transmit paths further comprises an isolator for selectively enabling or disabling the transmit path.

7. The signal combining apparatus according to claim 6 wherein the isolator comprises switch means and a resistive termination, the switch means being operative to selectively connect an input of one of the plurality of duplex combiners to an output of one of the plurality of transmit paths or to the resistive termination.

8. The signal combining apparatus according to claim 1 wherein each of the plurality of receive paths further comprises an isolator for selectively enabling or disabling the receive path.

9. The signal combining apparatus according to claim 8 wherein the isolator comprises switch means and a resistive termination, the switch means being operative to selectively connect an output of one of the plurality of duplex combiners to an input of one of the plurality of receive paths or to the resistive termination.

10. The signal combining apparatus according to claim 1 further comprising a switchable feedback path for selectively connecting an output of one of the plurality of transmit paths to an input of one of the plurality of receive paths.

11. The signal combining apparatus according to claim 10 wherein the feedback path includes a power sensor for measuring signal power in the one of the plurality of transmit paths.

12. The signal combining apparatus according to claim 11 further comprising heating means for maintaining the power sensor at a constant temperature.

13. The signal combining apparatus according to claim 1 further comprising:
   a power sensor for measuring the power of a signal output by one of the plurality of duplex combiners to one of the plurality of receive paths;
   a threshold detector for detecting whether the power of the signal output by the one of the plurality of duplex combiners meets a predetermined threshold; and
   control means for controlling a switchable attenuation such that if the power of the signal output by the one of the plurality of duplex combiners meets the threshold, the signal output by the one of the plurality of duplex combiners is attenuated.

14. The signal combining apparatus according to claim 13 wherein the control means is operative to control an isolator of the receive path such that when the power of the signal output by the one of the plurality of duplex combiners meets the threshold the output of the one of the plurality of duplex combiners is connected to a resistive termination.

* * * * *